(12) United States Patent
Matsushima et al.

(10) Patent No.: US 11,506,925 B2
(45) Date of Patent: Nov. 22, 2022

(54) LIQUID CRYSTAL DISPLAY DEVICE AND ELECTRONIC APPARATUS

(71) Applicants: Tianma Japan, Ltd., Kanagawa (JP); Wuhan Tianma Micro-Electronics Co., Ltd., Wuhan (CN)

(72) Inventors: Jin Matsushima, Kanagawa (JP); Tetsuroh Asakura, Kanagawa (JP); Yukie Keicho, Kanagawa (JP)

(73) Assignees: TIANMA JAPAN, LTD., Kanagawa (JP); Wuhan Tianma Micro-Electronics Co., Ltd., Wuhan (CN)

( * ) Notice: Subject to any disclaimer, the term of this patent is extended or adjusted under 35 U.S.C. 154(b) by 13 days.

(21) Appl. No.: 17/126,111

(22) Filed: Dec. 18, 2020

(65) Prior Publication Data
US 2021/0200024 A1 Jul. 1, 2021

(30) Foreign Application Priority Data
Dec. 26, 2019 (JP) .............................. JP2019-236988

(51) Int. Cl.
*G02F 1/1335* (2006.01)

(52) U.S. Cl.
CPC .. *G02F 1/133528* (2013.01); *G02F 1/133526* (2013.01)

(58) Field of Classification Search
CPC .......... C09J 2203/318; G02F 1/133528; G02F 2202/28; G02F 1/133526
See application file for complete search history.

(56) References Cited

U.S. PATENT DOCUMENTS

| | | | | |
|---|---|---|---|---|
| 2016/0291225 A1* | 10/2016 | Sato | ..................... | G02F 1/1335 |
| 2017/0335144 A1* | 11/2017 | Mitsui | .................. | C09J 133/066 |
| 2019/0091970 A1* | 3/2019 | Ueki | ..................... | B32B 27/365 |
| 2019/0162991 A1* | 5/2019 | Hagiwara | ............. | G02F 1/1397 |

FOREIGN PATENT DOCUMENTS

JP 2008-231358 A 10/2008

* cited by examiner

*Primary Examiner* — Michael H Caley
*Assistant Examiner* — Jonathan Y Jung
(74) *Attorney, Agent, or Firm* — Sughrue Mion, PLLC (57) ABSTRACT

A liquid crystal display device includes a first liquid crystal display panel including a first light-transmitting substrate (thickness T2≤0.3 mm), a substrate, a first liquid crystal, a first polarizing plate having a second main surface that is adhered to the first light-transmitting substrate; an adhering layer provided on a first main surface of the first polarizing plate; and a second light-transmitting substrate (thickness T3≤0.3 mm) adhered to the first main surface by the adhering layer (thickness T1≤0.15 mm). An adhesion parameter α is 1.04 or less when a maximum height of an unevenness of the first main surface 0.0005 mm or less, and the adhesion parameter α is 0.43 or less when the maximum height of the unevenness of the first main surface is greater than 0.0005 mm and 0.001 mm or less.

6 Claims, 10 Drawing Sheets

STORAGE MODULUS AND LOSS TANGENT OF ADHERING LAYER

| ADHESIVE | STORAGE MODULUS (MPa) | LOSS TANGENT |
|---|---|---|
| AD1 | 6.3 | 0.39 |
| AD2 | 4.8 | 0.87 |
| AD3 | 6.2 | 1.17 |
| AD4 | 3.5 | 0.50 |
| AD5 | 5.1 | 0.84 |

FIG.15

LIQUID CRYSTAL DISPLAY DEVICES USING
POLARIZING PLATE P1 AS FIRST POLARIZING PLATE

| | FIRST POLARIZING PLATE | ADHESIVE | T1(mm) | T2(mm) | T3(mm) | α | EVALUATION |
|---|---|---|---|---|---|---|---|
| EXAMPLE 1 | P1 | AD1 | 0.050 | 0.100 | 0.145 | 0.43 | ◎ |
| EXAMPLE 2 | P1 | AD2 | 0.050 | 0.100 | 0.145 | 0.60 | ○ |
| EXAMPLE 3 | P1 | AD2 | 0.050 | 0.100 | 0.300 | 0.81 | ○ |
| EXAMPLE 4 | P1 | AD2 | 0.100 | 0.100 | 0.145 | 0.43 | ◎ |
| EXAMPLE 5 | P1 | AD2 | 0.100 | 0.100 | 0.300 | 0.57 | ○ |
| EXAMPLE 6 | P1 | AD2 | 0.150 | 0.100 | 0.145 | 0.35 | ◎ |
| EXAMPLE 7 | P1 | AD2 | 0.150 | 0.100 | 0.300 | 0.47 | ◎ |
| EXAMPLE 8 | P1 | AD3 | 0.100 | 0.100 | 0.145 | 0.51 | ◎ |
| EXAMPLE 9 | P1 | AD3 | 0.100 | 0.100 | 0.300 | 0.68 | ◎ |
| EXAMPLE 10 | P1 | AD4 | 0.100 | 0.100 | 0.145 | 0.50 | ◎ |
| EXAMPLE 11 | P1 | AD4 | 0.100 | 0.100 | 0.300 | 0.67 | ◎ |
| EXAMPLE 12 | P1 | AD5 | 0.050 | 0.100 | 0.145 | 0.77 | ◎ |
| EXAMPLE 13 | P1 | AD5 | 0.050 | 0.100 | 0.210 | 0.90 | ○ |
| EXAMPLE 14 | P1 | AD5 | 0.050 | 0.100 | 0.300 | 1.04 | ◎ |
| EXAMPLE 15 | P1 | AD5 | 0.050 | 0.200 | 0.145 | 0.14 | ◎ |
| EXAMPLE 16 | P1 | AD5 | 0.050 | 0.300 | 0.145 | 0.05 | ◎ |
| EXAMPLE 17 | P1 | AD5 | 0.100 | 0.100 | 0.145 | 0.55 | ◎ |
| EXAMPLE 18 | P1 | AD5 | 0.100 | 0.100 | 0.210 | 0.64 | ◎ |
| EXAMPLE 19 | P1 | AD5 | 0.100 | 0.100 | 0.300 | 0.73 | ◎ |
| EXAMPLE 20 | P1 | AD5 | 0.100 | 0.200 | 0.145 | 0.10 | ◎ |
| EXAMPLE 21 | P1 | AD5 | 0.100 | 0.300 | 0.145 | 0.04 | ◎ |
| COMPARATIVE EXAMPLE 1 | P1 | AD1 | 0.050 | 0.100 | 0.145 | 6.78 | × |
| COMPARATIVE EXAMPLE 2 | P1 | AD1 | 0.050 | 0.100 | 0.200 | 7.71 | × |
| COMPARATIVE EXAMPLE 3 | P1 | AD1 | 0.050 | 0.100 | 0.210 | 7.86 | × |
| COMPARATIVE EXAMPLE 4 | P1 | AD1 | 0.050 | 0.100 | 0.300 | 9.06 | × |
| COMPARATIVE EXAMPLE 5 | P1 | AD1 | 0.050 | 0.200 | 0.145 | 1.20 | × |

FIG.16

LIQUID CRYSTAL DISPLAY DEVICES USING
POLARIZING PLATE P2 AS FIRST POLARIZING PLATE

| | FIRST POLARIZING PLATE | ADHESIVE | T1(mm) | T2(mm) | T3(mm) | α | EVALUATION |
|---|---|---|---|---|---|---|---|
| EXAMPLE 22 | P2 | AD1 | 0.050 | 0.100 | 0.145 | 0.43 | ◎ |
| EXAMPLE 23 | P2 | AD2 | 0.050 | 0.100 | 0.145 | 0.60 | ◎ |
| EXAMPLE 24 | P2 | AD2 | 0.050 | 0.100 | 0.300 | 0.81 | ○ |
| EXAMPLE 25 | P2 | AD2 | 0.100 | 0.100 | 0.145 | 0.43 | ◎ |
| EXAMPLE 26 | P2 | AD2 | 0.100 | 0.100 | 0.300 | 0.57 | ◎ |
| EXAMPLE 27 | P2 | AD2 | 0.150 | 0.100 | 0.145 | 0.35 | ◎ |
| EXAMPLE 28 | P2 | AD2 | 0.150 | 0.100 | 0.300 | 0.47 | ◎ |
| EXAMPLE 29 | P2 | AD3 | 0.100 | 0.100 | 0.145 | 0.51 | ◎ |
| EXAMPLE 30 | P2 | AD3 | 0.100 | 0.100 | 0.300 | 0.68 | ◎ |
| EXAMPLE 31 | P2 | AD4 | 0.100 | 0.100 | 0.145 | 0.50 | ◎ |
| EXAMPLE 32 | P2 | AD4 | 0.100 | 0.100 | 0.300 | 0.67 | ◎ |
| EXAMPLE 33 | P2 | AD5 | 0.050 | 0.100 | 0.145 | 0.77 | ◎ |
| EXAMPLE 34 | P2 | AD5 | 0.050 | 0.100 | 0.210 | 0.90 | ◎ |
| EXAMPLE 35 | P2 | AD5 | 0.050 | 0.100 | 0.300 | 1.04 | ◎ |
| EXAMPLE 36 | P2 | AD5 | 0.050 | 0.200 | 0.145 | 0.14 | ◎ |
| EXAMPLE 37 | P2 | AD5 | 0.050 | 0.300 | 0.145 | 0.05 | ◎ |
| EXAMPLE 38 | P2 | AD5 | 0.100 | 0.100 | 0.145 | 0.55 | ◎ |
| EXAMPLE 39 | P2 | AD5 | 0.100 | 0.100 | 0.210 | 0.64 | ◎ |
| EXAMPLE 40 | P2 | AD5 | 0.100 | 0.100 | 0.300 | 0.73 | ◎ |
| EXAMPLE 41 | P2 | AD5 | 0.100 | 0.200 | 0.145 | 0.10 | ◎ |
| EXAMPLE 42 | P2 | AD5 | 0.100 | 0.300 | 0.145 | 0.04 | ◎ |
| COMPARATIVE EXAMPLE 6 | P2 | AD1 | 0.050 | 0.100 | 0.145 | 6.78 | × |
| COMPARATIVE EXAMPLE 7 | P2 | AD1 | 0.050 | 0.100 | 0.200 | 7.71 | × |
| COMPARATIVE EXAMPLE 8 | P2 | AD1 | 0.050 | 0.100 | 0.210 | 7.86 | × |
| COMPARATIVE EXAMPLE 9 | P2 | AD1 | 0.050 | 0.100 | 0.300 | 9.06 | × |
| COMPARATIVE EXAMPLE 10 | P2 | AD1 | 0.050 | 0.200 | 0.145 | 1.20 | × |

FIG.17

LIQUID CRYSTAL DISPLAY DEVICES USING
POLARIZING PLATE P3 AS FIRST POLARIZING PLATE

| | FIRST POLARIZING PLATE | ADHESIVE | T1(mm) | T2(mm) | T3(mm) | α | EVALUATION |
|---|---|---|---|---|---|---|---|
| EXAMPLE 43 | P3 | AD1 | 0.050 | 0.300 | 0.145 | 0.43 | ◎ |
| EXAMPLE 44 | P3 | AD2 | 0.100 | 0.100 | 0.145 | 0.43 | ○ |
| EXAMPLE 45 | P3 | AD2 | 0.150 | 0.100 | 0.145 | 0.35 | ◎ |
| EXAMPLE 46 | P3 | AD2 | 0.150 | 0.100 | 0.300 | 0.47 | ◎ |
| EXAMPLE 47 | P3 | AD5 | 0.050 | 0.200 | 0.145 | 0.14 | ◎ |
| EXAMPLE 48 | P3 | AD5 | 0.050 | 0.300 | 0.145 | 0.05 | ◎ |
| EXAMPLE 49 | P3 | AD5 | 0.100 | 0.200 | 0.145 | 0.10 | ◎ |
| EXAMPLE 50 | P3 | AD5 | 0.100 | 0.300 | 0.145 | 0.04 | ◎ |
| COMPARATIVE EXAMPLE 11 | P3 | AD1 | 0.050 | 0.100 | 0.145 | 6.78 | / |
| COMPARATIVE EXAMPLE 12 | P3 | AD1 | 0.050 | 0.100 | 0.200 | 7.71 | / |
| COMPARATIVE EXAMPLE 13 | P3 | AD1 | 0.050 | 0.100 | 0.210 | 7.86 | × |
| COMPARATIVE EXAMPLE 14 | P3 | AD1 | 0.050 | 0.100 | 0.300 | 9.06 | × |
| COMPARATIVE EXAMPLE 15 | P3 | AD1 | 0.050 | 0.200 | 0.145 | 1.26 | × |
| COMPARATIVE EXAMPLE 16 | P3 | AD2 | 0.050 | 0.100 | 0.145 | 0.60 | / |
| COMPARATIVE EXAMPLE 17 | P3 | AD2 | 0.050 | 0.100 | 0.300 | 0.81 | × |
| COMPARATIVE EXAMPLE 18 | P3 | AD2 | 0.100 | 0.100 | 0.300 | 0.57 | × |
| COMPARATIVE EXAMPLE 19 | P3 | AD3 | 0.100 | 0.100 | 0.145 | 0.51 | × |
| COMPARATIVE EXAMPLE 20 | P3 | AD3 | 0.100 | 0.100 | 0.300 | 0.68 | × |
| COMPARATIVE EXAMPLE 21 | P3 | AD4 | 0.100 | 0.100 | 0.145 | 0.50 | / |
| COMPARATIVE EXAMPLE 22 | P3 | AD4 | 0.100 | 0.100 | 0.300 | 0.67 | × |
| COMPARATIVE EXAMPLE 23 | P3 | AD5 | 0.050 | 0.100 | 0.145 | 0.77 | × |
| COMPARATIVE EXAMPLE 24 | P3 | AD5 | 0.050 | 0.100 | 0.210 | 0.90 | × |
| COMPARATIVE EXAMPLE 25 | P3 | AD5 | 0.050 | 0.100 | 0.300 | 1.04 | × |
| COMPARATIVE EXAMPLE 26 | P3 | AD5 | 0.100 | 0.100 | 0.145 | 0.55 | / |
| COMPARATIVE EXAMPLE 27 | P3 | AD5 | 0.100 | 0.100 | 0.210 | 0.64 | × |
| COMPARATIVE EXAMPLE 28 | P3 | AD5 | 0.100 | 0.100 | 0.300 | 0.73 | × |

LIQUID CRYSTAL DISPLAY DEVICE AND ELECTRONIC APPARATUS

CROSS-REFERENCE TO RELATED APPLICATION

This application claims the benefit of Japanese Patent Application No. 2019-236988, filed on Dec. 26, 2019, the entire disclosure of which is incorporated by reference herein.

FIELD

The present disclosure relates generally to a liquid crystal display device and an electronic apparatus.

BACKGROUND

Liquid crystal display devices in which a protective panel, a touch panel, a lens sheet, or the like are adhered to a display surface (polarizing plate) of a liquid crystal display panel are known. For example, Unexamined Japanese Patent Application Publication No. 2008-231358 discloses an electronic terminal image display module in which a transparent surface protection panel and an image display panel (for example, a liquid crystal display (LCD) module) are adhered on the entire surface via a double-sided adhesive sheet. The double-sided adhesive sheet includes an adhesive layer. The loss tangent of the dynamic viscoelastic spectrum of the adhesive layer at a frequency of 1 Hz and 20° C. is from 0.6 to 1.5. The storage modulus of the adhesive layer at 80° C. is $1.0 \times 10^5$ Pa or greater.

In a liquid crystal display device in which members are adhered to a display surface of a liquid crystal display panel, in order to reduce the thickness of liquid crystal display device, it is preferable that the thicknesses of the substrates forming the members, the thickness of the substrate of the liquid crystal display panel, the thickness of the adhesive layer, and the like be reduced. Additionally, in order to increase the definition of three-dimensional images in a three-dimensional image display device including a lens sheet, it is preferable that the gap between the pixels of the liquid crystal display panel and the lens sheet be narrowed. That is, it is preferable that the thickness of the lens sheet, the thickness of the substrate on the side of the liquid crystal display panel where the lens sheet is adhered, the thickness of the adhesive layer, and the like be reduced.

However, when the thickness of the lens sheet, the thickness of the substrate on the side of the liquid crystal display panel where the member is adhered, the thickness of the adhesive layer, and the like are reduced, non-uniformities may occur in the gap (cell gap) between the substrates of the liquid crystal display panel, which may lead to the occurrence of display non-uniformities of the liquid crystal display device.

SUMMARY

A liquid crystal display device includes:
a first liquid crystal display panel including a first light-transmitting substrate, a substrate, a first liquid crystal sandwiched between the first light-transmitting substrate and the substrate, and a first polarizing plate that includes a first main surface and a second main surface on a side opposite the first main surface, the second main surface being adhered to the first light-transmitting substrate;
an adhering layer provided on the first main surface of the first polarizing plate; and
a second light-transmitting substrate that is adhered to the first main surface of the first polarizing plate by the adhering layer, wherein
a thickness of the adhering layer is 0.15 mm or less, and a thickness of the first light-transmitting substrate and a thickness of the second light-transmitting substrate are 0.3 mm or less, and
when the thickness of the adhering layer is T1 (m) and a storage modulus and a loss tangent of the adhering layer at 20° C. and 2.5 Hz are respectively A (Pa) and B (dimensionless quantity), the thickness of the first light-transmitting substrate is T2 (m), the thickness of the second light-transmitting substrate is T3 (m), and an adhesion parameter expressed by formula (1) below is α, $$\alpha = 10^{-31} \times \frac{A^3 \times (T3)^{0.4}}{B^2 \times (T1)^{0.5} \times (T2)^{2.5}} \quad (1)$$

when a maximum height of an unevenness of the first main surface of the first polarizing plate is 0.0005 mm or less, the adhesion parameter is 1.04 or less, and when the maximum height of the unevenness of the first main surface of the first polarizing plate is greater than 0.0005 mm and 0.001 mm or less, the adhesion parameter is 0.43 or less.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a liquid crystal display device according to various embodiments is described while referencing the drawings.

Embodiment 1

Figure 1:
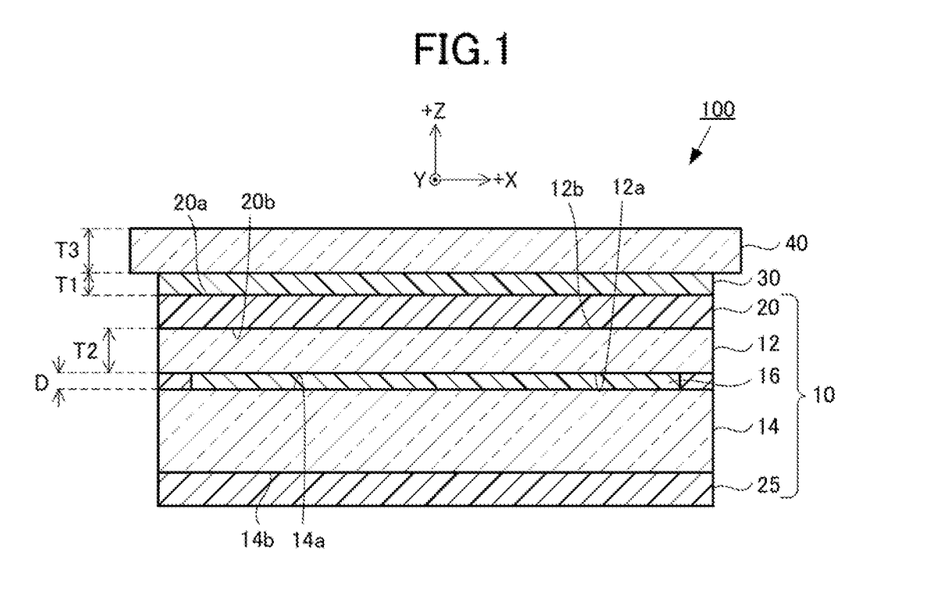
FIG. 1 is a schematic drawing illustrating a cross-section of a liquid crystal display device according to Embodiment 1.
Figure 2:
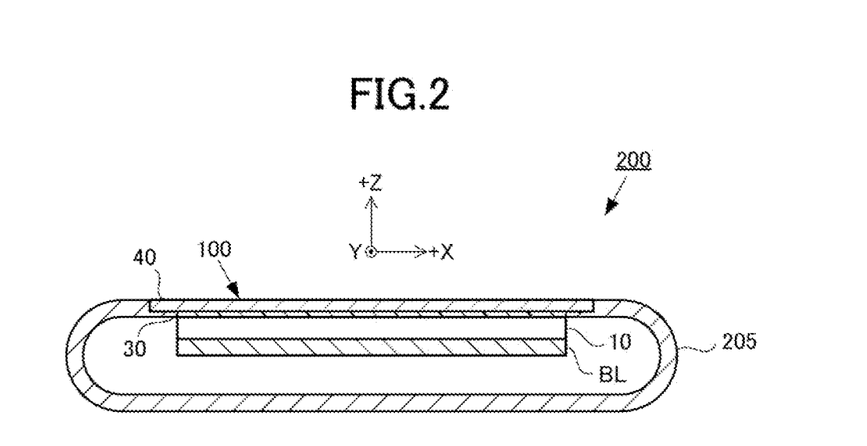
FIG. 2 is a schematic drawing illustrating a cross-section of an electronic apparatus according to Embodiment 1.

A liquid crystal display device 100 according to the present embodiment is described while referencing FIGS. 1 to 4. As illustrated in FIG. 1, the liquid crystal display device 100 includes a first liquid crystal display panel 10, an adhering layer 30, and a second light-transmitting substrate 40. As illustrated in FIG. 2, the liquid crystal display device 100 is mounted on an electronic apparatus 200 such as a smartphone, a tablet, a personal computer, or the like. For example, the liquid crystal display device 100 and a backlight BL that is a light source of the liquid crystal display device 100 are provided in a housing 205 of the electronic apparatus 200. Note that, in the present description, to facilitate comprehension, in the liquid crystal display device 100 of FIG. 1, the right direction (the right direction on paper) is referred to as the "+X direction", the up direction (the up direction on paper) is referred to as the "+Z direction", and the direction perpendicular to the +X direction and the +Z direction (the front direction on paper) is referred to as the "+Y direction." Additionally, in FIG. 2, the hatching of the first liquid crystal display panel 10 is omitted.

The first liquid crystal display panel 10 of the liquid crystal display device 100 is a liquid crystal display panel that displays text, color images, and the like. The adhering layer 30 of the liquid crystal display device 100 adheres the first liquid crystal display panel 10 and the second light-transmitting substrate 40 to each other. In the present embodiment, the second light-transmitting substrate 40 of the liquid crystal display device 100 functions as a protective panel that protects the first liquid crystal display panel 10.

In the present embodiment, a hereinafter described adhesion parameter α satisfies a predetermined condition. The adhesion parameter α is calculated from a thickness T1 of the adhering layer 30, a storage modulus A and a loss tangent B of the adhering layer 30 at 20° C. and 2.5 Hz, a hereinafter described thickness T2 of a first light-transmitting substrate 12 of the first liquid crystal display panel 10, and a thickness T3 of the second light-transmitting substrate 40.

In one example, the first liquid crystal display panel 10 of the liquid crystal display device 100 is implemented as a transmissive liquid crystal display panel that is driven by a thin film transistor (TFT). The first liquid crystal display panel 10 displays text, color images, and the like according to signals from a non-illustrated controller and a non-illustrated drive circuit.

As illustrated in FIG. 1, the first liquid crystal display panel 10 includes a first light-transmitting substrate 12, a substrate 14, a first liquid crystal 16, a first polarizing plate 20, and a second polarizing plate 25. The first light-transmitting substrate 12 and the substrate 14 sandwich the first liquid crystal 16. The first polarizing plate 20 is adhered to the first light-transmitting substrate 12. The second polarizing plate 25 is adhered to the substrate 14.

The first light-transmitting substrate 12 of the first liquid crystal display panel 10 transmits visible light. In one example, the first light-transmitting substrate 12 is implemented as a glass substrate. The first light-transmitting substrate 12 includes, on a surface 12a that sandwiches the first liquid crystal 16, a stripe-like color filter, electrodes, an alignment film, and the like (all not illustrated in the drawings). The first polarizing plate 20 is adhered to a surface 12b. The surface 12b is a side of the first light-transmitting substrate 12 opposite the surface 12a.

The thickness T2 of the first light-transmitting substrate 12 is 0.3 mm or less. The relationship between the thickness T2 of the first light-transmitting substrate 12, the adhesion parameter α, and display non-uniformity is described later.

As with the first light-transmitting substrate 12, the substrate 14 of the first liquid crystal display panel 10 transmits visible light. In one example, the substrate 14 is implemented as a glass substrate. The substrate 14 includes, on a surface 14a sandwiching the first liquid crystal 16, a TFT, wirings, electrodes, an alignment film, and the like (all not illustrated in the drawings). The second polarizing plate 25 is adhered to a surface 14b. The surface 14b is a side of the substrate 14 opposite the surface 14a. Note that, in the present embodiment, the thickness of the substrate 14 is not limited. Additionally, the substrate 14 and the first light-transmitting substrate 12 are adhered to each other with a predetermined gap (cell gap) D via a spacer and a sealing material (both not illustrated in the drawings).

The first liquid crystal 16 of the first liquid crystal display panel 10 is sandwiched between the first light-transmitting substrate 12 and the substrate 14. The first liquid crystal 16 is a nematic liquid crystal, and the first liquid crystal display panel 10 operates in twisted nematic (TN) mode.

Figure 3:
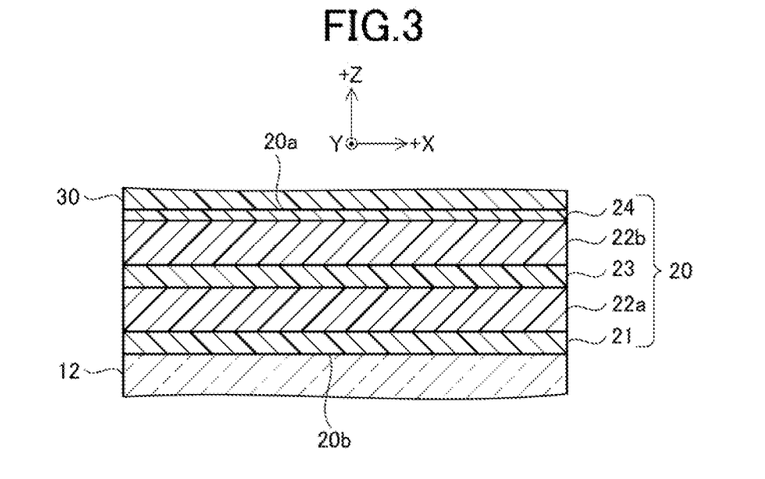
FIG. 3 is a schematic drawing illustrating a cross-section of a first polarizing plate according to Embodiment 1.

The first polarizing plate 20 of the first liquid crystal display panel 10 includes a first main surface 20a, and a second main surface 20b on a side opposite the first main surface 20a. The second main surface 20b of the first polarizing plate 20 is adhered to the surface 12b of the first light-transmitting substrate 12. In one example, as illustrated in FIG. 3, the first polarizing plate 20 includes, in order from the first light-transmitting substrate 12 side, an adhesive layer 21, a triacetylcellulose (TAC) layer 22a, a polarizing layer 23 formed from polyvinyl alcohol (PVA), iodine (I) or the like, a TAC layer 22b, and a hard coat layer 24. In the first polarizing plate 20, the hard coat layer 24 is optional. Additionally, a layer that imparts light with a phase difference may be added between the TAC layer 22a and the polarizing layer 23 in order to improve the viewing angle of the first liquid crystal display panel 10.

Figure 4:
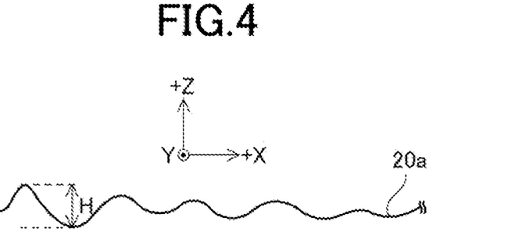
FIG. 4 is a schematic drawing illustrating an unevenness of a first main surface of the first polarizing plate according to Embodiment 1.

In the present embodiment, the surface of the hard coat layer 24 is the first main surface 20a of the first polarizing plate 20. The surface of the adhesive layer 21 that adheres to the first light-transmitting substrate 12 is the second main surface 20b of the first polarizing plate 20. A maximum height H of an unevenness of the first main surface 20a illustrated in FIG. 4 is 0.001 mm or less. The relationship between the maximum height H of the unevenness of the first main surface 20a, the adhesion parameter α, and display non-uniformity is described later.

The second polarizing plate 25 of the first liquid crystal display panel 10 is adhered to the surface 14b of the substrate 14. The second polarizing plate 25 includes, in order from the substrate 14 side, the adhesive layer 21, the TAC layer 22a, the polarizing layer 23, the TAC layer 22b, and the hard coat layer 24. As with the first polarizing plate 20, in the second polarizing plate 25, the hard coat layer 24 is optional.

The adhering layer 30 of the liquid crystal display device 100 is provided on the first main surface 20a of the first polarizing plate 20 of the first liquid crystal display panel 10. The adhering layer 30 adheres the second light-transmitting substrate 40 to the first polarizing plate 20 of the first liquid crystal display panel 10. In one example, the adhering layer 30 is formed from an acrylic adhesive.

The thickness T1 of the adhering layer 30 is 0.15 mm or less. The adhering layer 30 has a storage modulus A and a loss tangent B at 20° C. and 2.5 Hz that satisfy a predetermined condition. In the present embodiment, the storage modulus A and the loss tangent B of the adhering layer 30 at 20° C. and 2.5 Hz are calculated in a thin film state by dynamic viscoelasticity measurement using the nanoindentation method. The relationship between the thickness T1 of the adhering layer 30, the storage modulus A and the loss tangent B of the adhering layer 30 at 20° C. and 2.5 Hz, the adhesion parameter α, and display non-uniformity is described later.

As with the first light-transmitting substrate 12, the second light-transmitting substrate 40 of the liquid crystal display device 100 transmits visible light. In one example, the second light-transmitting substrate 40 is implemented as a glass substrate. The second light-transmitting substrate 40 is adhered to the first polarizing plate 20 of the first liquid crystal display panel 10 by the adhering layer 30. In the present embodiment, the second light-transmitting substrate 40 protects the first liquid crystal display panel 10. The thickness T3 of the second light-transmitting substrate 40 is 0.3 mm or less.

Next, the relationship between the adhesion parameter α and display non-uniformity is described. The adhesion parameter α is calculated according to formula (1) below from the thickness T1 (m) of the adhering layer 30, the storage modulus A (Pa) and the loss tangent B (dimensionless quantity) of the adhering layer 30 at 20° C. and 2.5 Hz, the thickness T2 (m) of the first light-transmitting substrate 12 of the first liquid crystal display panel 10, and the thickness T3 (m) of the second light-transmitting substrate 40. Here, the thickness T1 of the adhering layer 30≤0.15 mm, the thickness T2 of the first light-transmitting substrate 12≤0.3 mm, and the thickness T3 of the second light-transmitting substrate 40≤0.3 mm.

$$\alpha = 10^{-31} \times \frac{A^3 \times (T3)^{0.4}}{B^2 \times (T1)^{0.5} \times (T2)^{2.5}} \quad (1)$$

In the present embodiment, in a case in which the maximum height H of the unevenness of the first main surface 20a of the first polarizing plate 20 is 0.0005 mm or less, the thickness T1 of the adhering layer 30 (T1≤0.15 mm), the storage modulus A and the loss tangent B of the adhering layer 30 at 20° C. and 2.5 Hz, the thickness T2 of the first light-transmitting substrate 12 of the first liquid crystal display panel 10 (T2≤0.3 mm), and the thickness T3 of the second light-transmitting substrate 40 (T3≤0.3 mm) satisfy the condition of the adhesion parameter α≤1.04. Additionally, in a case in which the maximum height H of the unevenness of the first main surface 20a of the first polarizing plate 20 is greater than 0.0005 mm and 0.001 mm or less, the thickness T1 of the adhering layer 30 (T1≤0.15 mm), the storage modulus A and the loss tangent B of the adhering layer 30 at 20° C. and 2.5 Hz, the thickness T2 of the first light-transmitting substrate 12 of the first liquid crystal display panel 10 (T2≤0.3 mm), and the thickness T3 of the second light-transmitting substrate 40 (T3≤0.3 mm) satisfy the condition of the adhesion parameter α≤0.43. By satisfying these conditions, non-uniformity, due to the unevenness of the first polarizing plate 20, of the gap D between the substrate 14 and the first light-transmitting substrate 12 of the first liquid crystal display panel 10 can be suppressed, and display non-uniformity of the liquid crystal display device 100 can be suppressed. Non-uniformity of the gap D due to the unevenness of the first polarizing plate 20 occurs as a result of the second light-transmitting substrate 40 being adhered to the first polarizing plate 20.

The liquid crystal display device 100 is manufactured by providing the adhering layer 30 on the first main surface 20a of the first polarizing plate 20 of the first liquid crystal display panel 10 and, then, adhering the second light-transmitting substrate 40 to the adhering layer 30.

As described above, by setting the adhesion parameter α≤1.04 when the maximum height H of the unevenness of the first main surface 20a of the first polarizing plate 20 is 0.0005 mm or less, display non-uniformity of the liquid crystal display device 100 can be suppressed. Additionally, by setting the adhesion parameter α≤0.43 when the maximum height H of the unevenness of the first main surface 20a of the first polarizing plate 20 is greater than 0.0005 mm and 0.001 mm or less, display non-uniformity of the liquid crystal display device 100 can be suppressed. Furthermore, since the thickness T1 of the adhering layer 30, the thickness T2 of the first light-transmitting substrate 12, and the thickness T3 of the second light-transmitting substrate 40 are thin, the thickness of the liquid crystal display device 100 can be reduced.

Embodiment 2

In Embodiment 1, the second light-transmitting substrate 40 adhered to the first polarizing plate 20 of the first liquid crystal display panel 10 functions as a protective panel that protects the first liquid crystal display panel 10. The second light-transmitting substrate 40 adhered to the first polarizing plate 20 of the first liquid crystal display panel 10 may constitute an element adhered to the first liquid crystal display panel 10.

Figure 5:
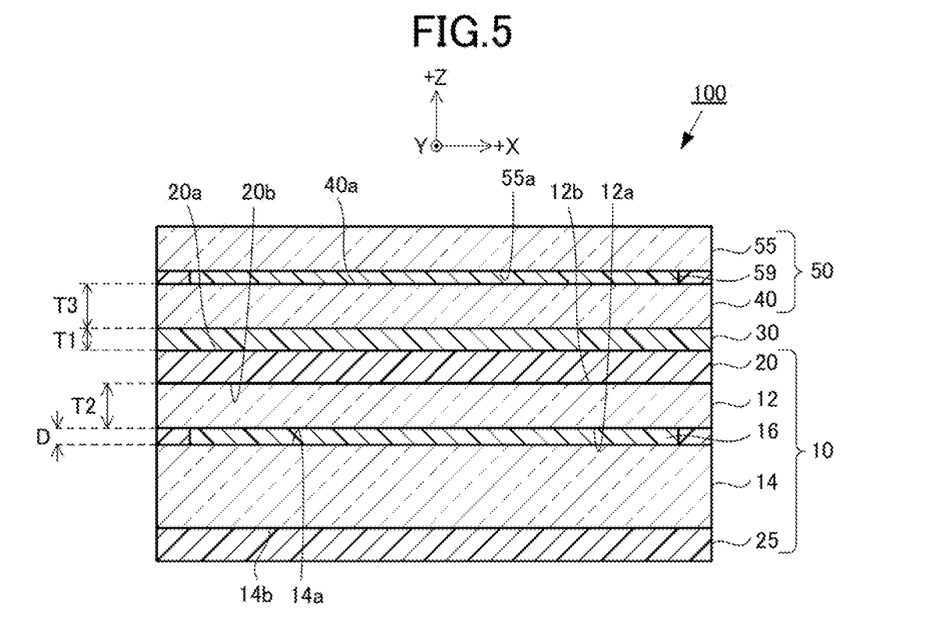
FIG. 5 is a schematic drawing illustrating a cross-section of a liquid crystal display device according to Embodiment 2.

The liquid crystal display device 100 of the present embodiment is a liquid crystal display device that is capable of switching images to be displayed between two-dimensional images and three-dimensional images. As illustrated in FIG. 5, the liquid crystal display device 100 of the present embodiment includes the first liquid crystal display panel 10, the adhering layer 30, and a liquid crystal lens element 50. In the present embodiment, the adhering layer 30 adheres the first polarizing plate 20 of the first liquid crystal display panel 10 and the liquid crystal lens element 50 to each other. The second light-transmitting substrate 40 of the present embodiment constitutes the liquid crystal lens element 50. The second light-transmitting substrate 40 of the present embodiment is adhered to the first polarizing plate 20 of the first liquid crystal display panel 10.

The configurations of the first liquid crystal display panel 10 and the adhering layer 30 of the present embodiment are the same as the first liquid crystal display panel 10 and the adhering layer 30 of Embodiment 1 and, as such, in the following, the liquid crystal lens element 50 is described.

The liquid crystal lens element 50 is adhered to the first liquid crystal display panel 10 by the adhering layer 30. The liquid crystal lens element 50 switches, on the basis of a voltage application state, between a state of functioning as a lens and a state of not functioning as a lens. In the present embodiment, the liquid crystal lens element 50 functions as a lenticular lens array in a state in which voltage is applied. The liquid crystal lens element 50 does not function as a lenticular lens array in a state in which voltage is not applied.

Figure 6:
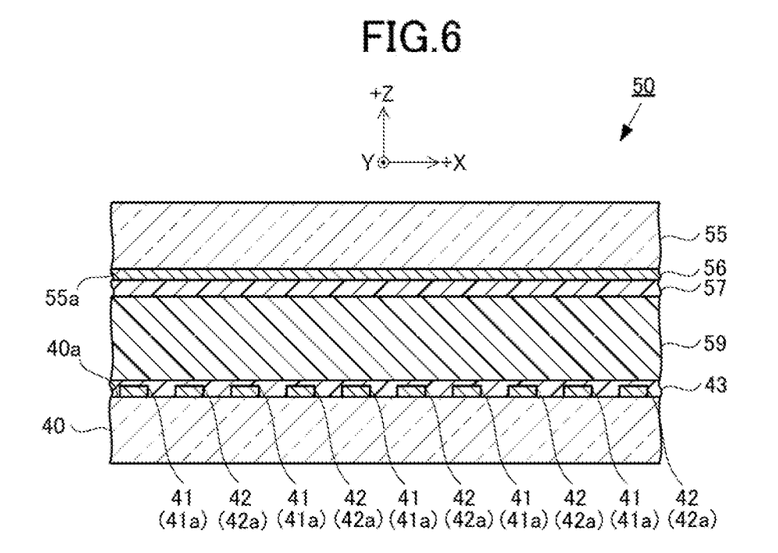
FIG. 6 is a schematic drawing illustrating a cross-section of a liquid crystal lens element according to Embodiment 2.

As illustrated in FIGS. 5 and 6, the liquid crystal lens element 50 includes the second light-transmitting substrate 40, a third light-transmitting substrate 55, and a second liquid crystal 59. The second light-transmitting substrate 40 and the third light-transmitting substrate 55 sandwich the second liquid crystal 59.

The second light-transmitting substrate 40 of the liquid crystal lens element 50 transmits visible light. In one example, the second light-transmitting substrate 40 of the liquid crystal lens element 50 is implemented as a glass substrate. The second light-transmitting substrate 40 of the liquid crystal lens element 50 is adhered to the first main surface 20a of the first polarizing plate 20 of the first liquid crystal display panel 10 by the adhering layer 30. As with the second light-transmitting substrate 40 of Embodiment 1, the thickness T3 of the second light-transmitting substrate 40 of the liquid crystal lens element 50 is 0.3 mm or less.

As illustrated in FIG. 6, comb tooth-like first electrodes 41 and second electrodes 42, and an alignment film 43 are provided on a surface 40a of the second light-transmitting substrate 40 of the liquid crystal lens element 50. Note that the surface 40a sandwiches the second liquid crystal 59. In one example, the first electrodes 41 and the second electrodes 42 are formed from indium tin oxide (ITO) on the surface 40a of the second light-transmitting substrate 40. The first electrodes 41 and the second electrodes 42 are connected to a non-illustrated drive circuit and controller.

Figure 7:
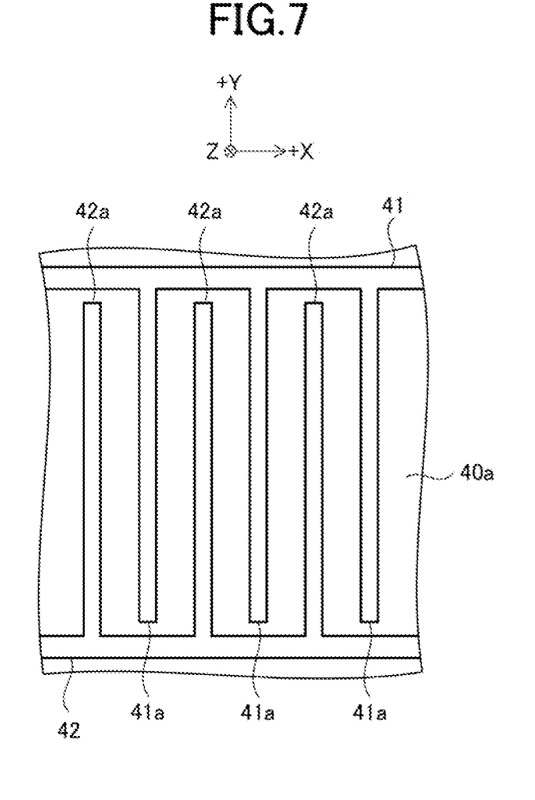
FIG. 7 is a schematic drawing illustrating first electrodes and second electrodes according to Embodiment 2.

As illustrated in FIG. 7, the first electrodes 41 include a plurality of electrodes 41a extending in the −Y direction. The second electrodes 42 include a plurality of electrodes 42a extending in the +Y direction. The electrodes 41a of the first electrodes 41 and the electrodes 42a of the second electrodes 42 are disposed at equal intervals along the X direction in an alternating manner. In the present embodiment, when viewing the liquid crystal display device 100 from above, one pixel row of the first liquid crystal display panel 10 is positioned in a region between an electrode 41a and an electrode 42a that are adjacent to each other.

In one example, the alignment film 43 is formed from polyimide. The alignment film 43 covers the first electrodes 41, the second electrodes 42, and the surface 40a of the second light-transmitting substrate 40. The alignment film 43 is subjected to an alignment treatment for aligning the second liquid crystal 59 in the X direction.

The third light-transmitting substrate 55 of the liquid crystal lens element 50 transmits visible light. In one example, the third light-transmitting substrate 55 is implemented as a glass substrate. As illustrated in FIG. 6, a counter electrode 56 and an alignment film 57 are provided on a surface 55a of the third light-transmitting substrate 55. Note that the surface 55a sandwiches the second liquid crystal 59. In one example, the counter electrode 56 is formed in a rectangular shape from ITO on the surface 55a of the third light-transmitting substrate 55. The counter electrode 56 faces the electrodes 41a of the first electrodes 41 and the electrodes 42a of the second electrodes 42. As with the first electrodes 41 and the second electrodes 42, the counter electrode 56 is connected to a drive circuit and a controller.

As with the alignment film 43, the alignment film 57 is formed from polyimide. The alignment film 57 covers the counter electrode 56 and the surface 55a of the third light-transmitting substrate 55. As with the alignment film 43, the alignment film 57 is subjected to an alignment treatment for aligning the second liquid crystal 59 along the X direction.

The second liquid crystal 59 of the liquid crystal lens element 50 is sandwiched between the second light-transmitting substrate 40 and the third light-transmitting substrate 55. The second liquid crystal 59 is implemented as a positive-type nematic liquid crystal. Due to the alignment treatment carried out on the alignment films 43 and 57, in a state in which voltage is not applied, the second liquid crystal 59 is homogeneously oriented in the X direction.

For example, when the potential of the first electrodes 41, the second electrodes 42, and the counter electrode 56 is ground potential, voltage is not applied to the second liquid crystal 59 and, as such, the homogeneous alignment of the second liquid crystal 59 is maintained. While the homogeneous alignment of the second liquid crystal 59 is maintained, the liquid crystal lens element 50 does not function as a lenticular lens array. The liquid crystal display device 100 of the present embodiment displays two-dimensional images when the liquid crystal lens element 50 is not functioning as a lenticular lens array.

Meanwhile, when the potential of the first electrodes 41 and the counter electrode 56 are the same, and the potential of the second electrodes 42 differs from the potential of the first electrodes 41 and the counter electrode 56, voltage is applied to the second liquid crystal 59 and, as such, the alignment state of the second liquid crystal 59 changes. In the present embodiment, due to the changing of the alignment state of the second liquid crystal 59, refraction distribution along the X direction that corresponds to a lenticular lens occurs in a region, when viewed from above, between a pair of the electrodes 42a sandwiching one of the electrodes 41a. In this case, the liquid crystal lens element 50 functions as a lenticular lens array, and the liquid crystal display device 100 of the present embodiment displays three-dimensional images.

As described above, the liquid crystal display device 100 of the present embodiment can switch the images to be displayed between two-dimensional images and three-dimensional images. Additionally, with the liquid crystal display device 100 of the present embodiment, since the thickness T1 of the adhering layer 30, the thickness T2 of the first light-transmitting substrate 12, and the thickness T3 of the second light-transmitting substrate 40 are thin, the gap between the first liquid crystal display panel 10 and the liquid crystal lens element 50 is narrow. Accordingly, the liquid crystal display device 100 of the present embodiment can display high-definition three-dimensional images.

Moreover, with the liquid crystal display device 100 of the present embodiment, the second light-transmitting substrate 40 of the liquid crystal lens element 50 is adhered to the first main surface 20a of the first polarizing plate 20 of the first liquid crystal display panel 10 by the adhering layer 30.

Accordingly, as with Embodiment 1, by setting the adhesion parameter α≤1.04 when the maximum height H of the unevenness of the first main surface 20a of the first polarizing plate 20 is 0.0005 mm or less, display non-uniformity of the liquid crystal display device 100 of the present embodiment can be suppressed. Additionally, by setting the adhesion parameter α≤0.43 when the maximum height H of the unevenness of the first main surface 20a of the first polarizing plate 20 is greater than 0.0005 mm and 0.001 mm or less, display non-uniformity of the liquid crystal display device 100 of the present embodiment can be suppressed.

Modified Examples

Embodiments have been described, but various modifications can be made to the present disclosure without departing from the spirit and scope of the present disclosure.

For example, the first liquid crystal display panels 10 of Embodiments 1 and 2 are transmissive liquid crystal display panels, but a configuration is possible in which the first liquid crystal display panel 10 is a reflective liquid crystal display panel. When the first liquid crystal display panel 10 is reflective liquid crystal display panel, the substrate 14 is provided with a reflection layer that reflects external light, for example. Additionally, the first liquid crystal display panels 10 in Embodiments 1 and 2 operate in TN mode, but a configuration is possible in which the first liquid crystal display panel 10 operates in vertical alignment (VA) mode, fringe field switching (FFS) mode, or the like.

Figure 8:
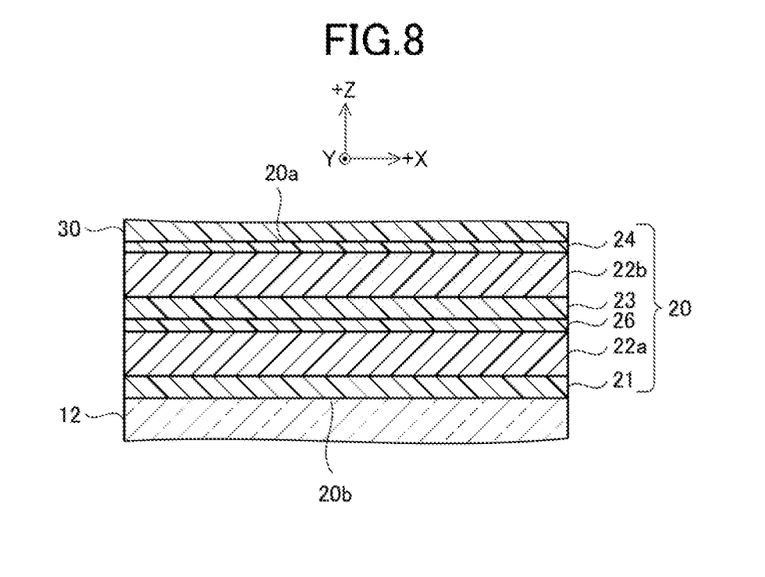
FIG. 8 is a schematic drawing illustrating a cross-section of a first polarizing plate according to a modified example.

A configuration is possible in which the first polarizing plate 20 of the first liquid crystal display panel 10 includes a phase difference layer 26 positioned between the polarizing layer 23 and the first light-transmitting substrate 12 adhered to the first polarizing plate 20. In one example, as illustrated in FIG. 8, the phase difference layer 26 is provided between the TAC layer 22a and the polarizing layer 23. The phase difference layer 26 improves the viewing angle of the first liquid crystal display panel 10.

In Embodiments 1 and 2, the first light-transmitting substrate 12 and the second light-transmitting substrate 40 are implemented as glass substrates, but any material can be used for the first light-transmitting substrate 12 and the second light-transmitting substrate 40. For example, the second light-transmitting substrate 40 may be formed from a material that has a Young's modulus of 70 Gpa or greater. Such a configuration improves the display stability of the first liquid crystal display panel 10 against impact, vibration, and the like. Additionally, with the first liquid crystal display panels 10 of Embodiments 1 and 2, the first light-transmitting substrate 12 includes a color filter, electrodes, an alignment film, and the like, and the substrate 14 includes a TFT, wirings, electrodes, an alignment film, and the like. However, a configuration is possible in which the first light-transmitting substrate 12 includes a TFT, wirings, electrodes, an alignment film, and the like, and the substrate 14 includes a color filter, electrodes, an alignment film, and the like.

Figure 9:
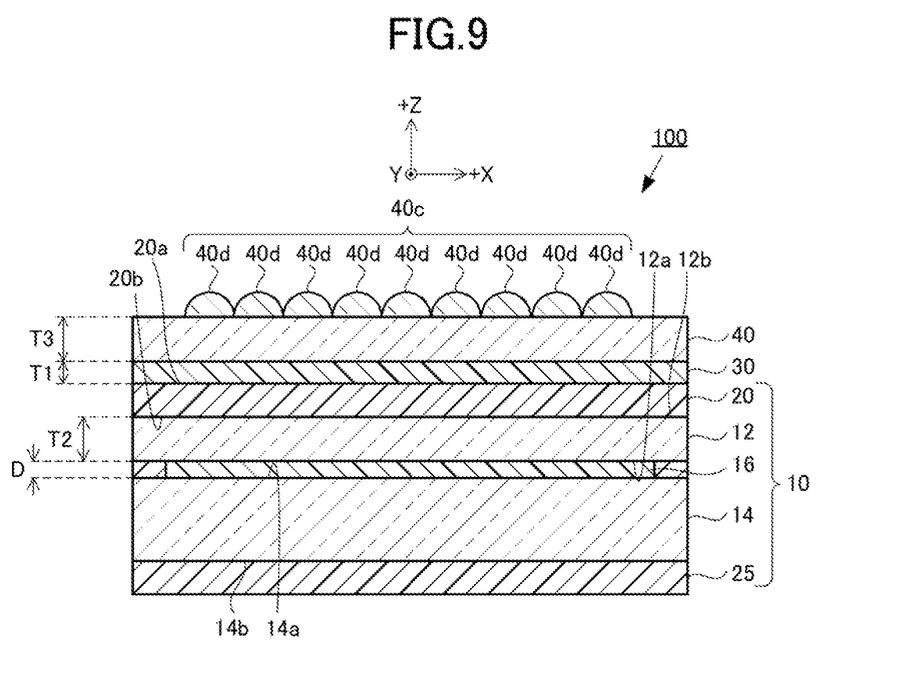
FIG. 9 is a schematic drawing illustrating a cross-section of a liquid crystal display device according to a modified example.
Figure 10:
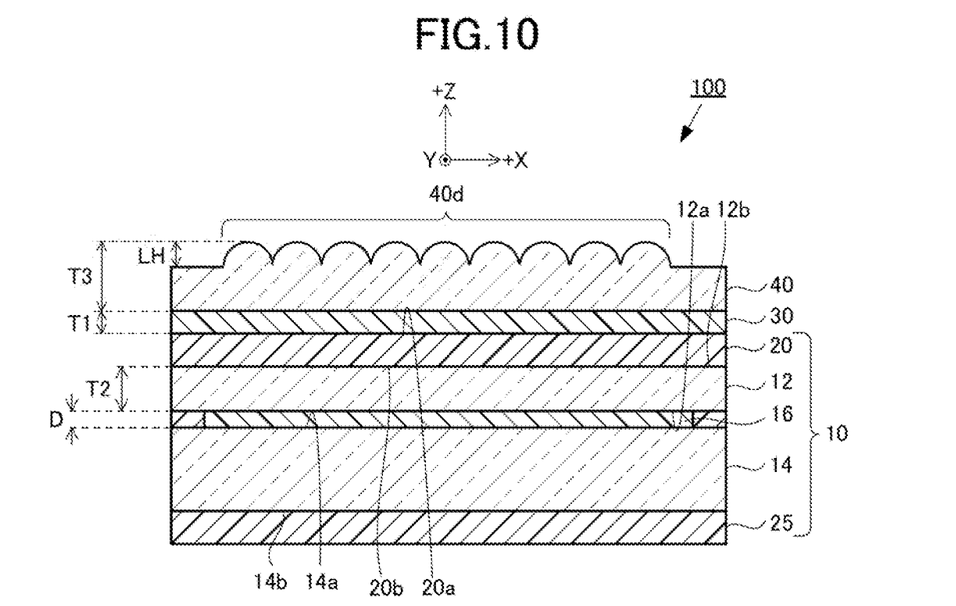
FIG. 10 is a schematic drawing illustrating a cross-section of a liquid crystal display device according to a modified example.

In Embodiment 1, the second light-transmitting substrate 40 functions as a protective panel that protects the first liquid crystal display panel 10. The second light-transmitting substrate 40 may function as a lens array. For example, as illustrated in FIG. 9, a configuration is possible in which the liquid crystal display device 100 includes a second light-transmitting substrate 40 that is provided with a lenticular lens section 40c. The second light-transmitting substrate 40 and the lenticular lens section 40c are formed separately. The lenticular lens section 40c includes a plurality of lenticular lenses 40d. Additionally, as illustrated in FIG. 10, a configuration is possible in which the plurality of lenticular lenses 40d is formed integrally with the second light-transmitting substrate 40. Note that the thickness T3 of the second light-transmitting substrate 40 that is formed integrally with the lenticular lenses 40d includes a height LH of the lenticular lenses 40d. Furthermore, a configuration is possible in which the liquid crystal display device 100 includes a second light-transmitting substrate 40 that includes arrayed micro lenses. A liquid crystal display device 100 that is provided with a second light-transmitting substrate 40 that functions as a lens array can display three-dimensional images.

Figure 11:
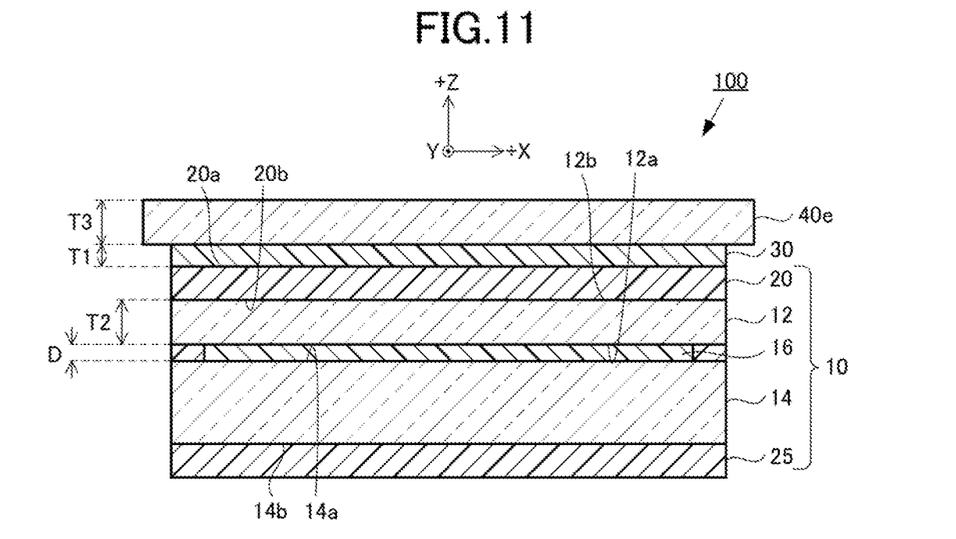
FIG. 11 is a schematic drawing illustrating a cross-section of a liquid crystal display device according to a modified example.
Figure 12:
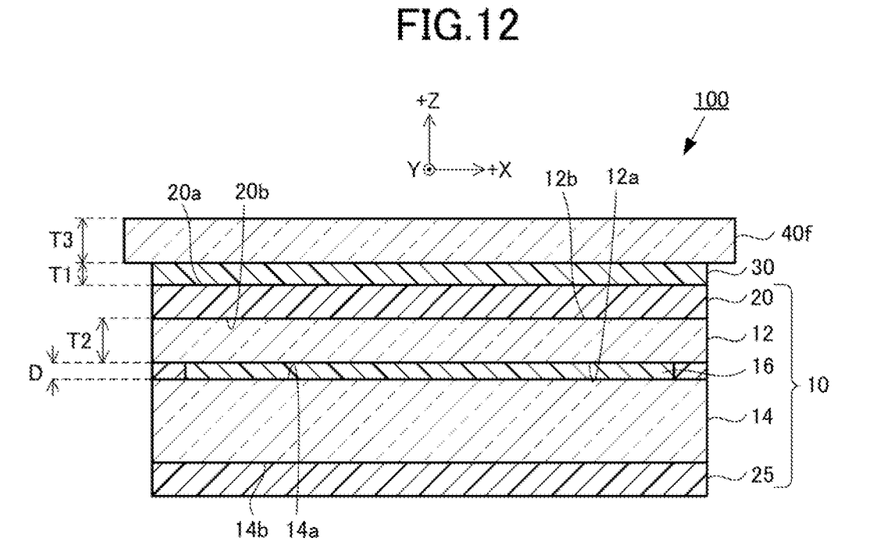
FIG. 12 is a schematic drawing illustrating a cross-section of a liquid crystal display device according to a modified example.

As illustrated in FIG. 11, a configuration is possible in which the second light-transmitting substrate 40 is implemented as a one-way mirror substrate 40e that includes a metal thin film and functions as a one-way mirror. Furthermore, a configuration is possible in which, in a liquid crystal display device 100 that displays three-dimensional images using the parallax barrier method, the second light-transmitting substrate 40 is implemented as a parallax barrier substrate 40f that includes a light-transmitting slit and that functions as a parallax barrier, as illustrated in FIG. 12.

Figure 13:
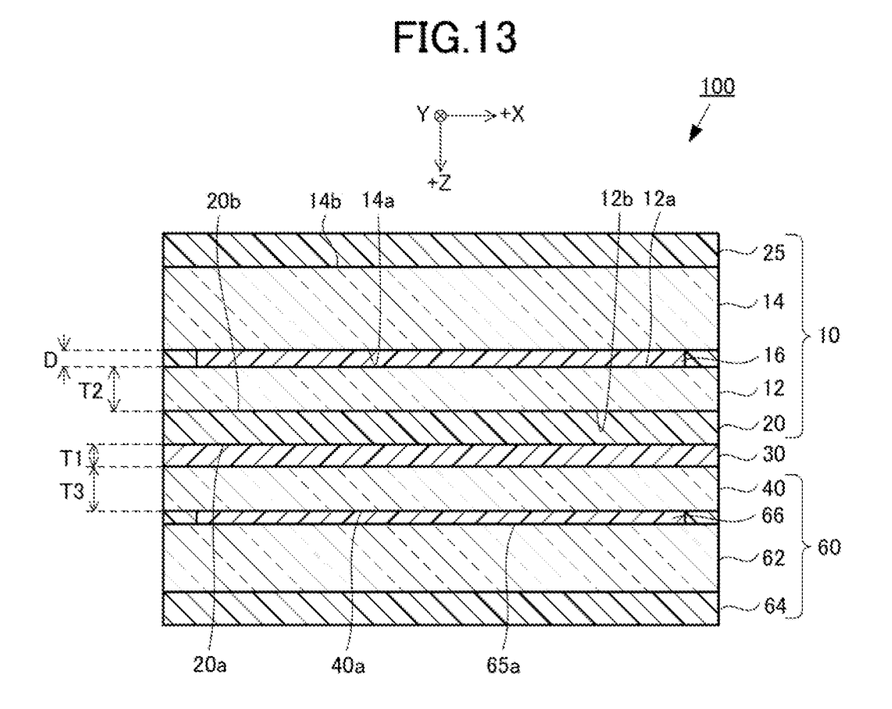
FIG. 13 is a schematic drawing illustrating a cross-section of a liquid crystal display device according to a modified example.

In Embodiment 2, the second light-transmitting substrate 40 constitutes the liquid crystal lens element 50. The second light-transmitting substrate 40 may constitute a second liquid crystal display panel 60. For example, as illustrated in FIG. 13, a configuration is possible in which the liquid crystal display device 100 includes the first liquid crystal display panel 10, the adhering layer 30 and a second liquid crystal display panel 60. The second liquid crystal display panel 60 includes the second light-transmitting substrate 40, a fourth light-transmitting substrate 62, a third polarizing plate 64, and a third liquid crystal 66. The second light-transmitting substrate 40 constitutes the second liquid crystal display panel 60. The second light-transmitting substrate 40 is adhered to the first main surface 20a of the first polarizing plate 20 of the first liquid crystal display panel 10 by the adhering layer 30. In one example, the second liquid crystal display panel 60 is implemented as a transmissive liquid crystal display panel that operates in TN mode. The second liquid crystal display panel 60 performs monochrome display. Note that the configurations of the first liquid crystal display panel 10 and the adhering layer 30 are the same as those of the first liquid crystal display panel 10 and the adhering layer 30 of Embodiment 1.

Preferred embodiments of the present disclosure have been described, but the present disclosure should not be construed as being limited to these specific embodiments. The scope of the invention is defined only by the included claims, along with the full range of equivalents to which such claims are entitled.

Examples

Hereinafter, the present disclosure is described in detail using examples, but the present disclosure is not limited to these examples.

Liquid crystal display devices 100 according to Embodiment 1 were fabricated as examples. The fabricated liquid crystal display devices 100 were visually observed to evaluate display non-uniformity. Additionally, liquid crystal display devices having the same configuration as the liquid crystal display device 100 of Embodiment 1, with the exception of the condition of the adhesion parameter α not being satisfied, were fabricated as comparative examples.

The liquid crystal display devices of the comparative examples were evaluated in the same manner as those of the examples.

First, the various members used to fabricate the liquid crystal display devices 100 of the examples and the liquid crystal display devices of the comparative examples, and an evaluation method are described.

Members

Glass substrates were used for the first light-transmitting substrate 12 and the substrate 14 of the first liquid crystal display panel 10, and for the second light-transmitting substrate 40. The thickness T2 of the first light-transmitting substrate 12 was from 0.100 mm to 0.300 mm, and the thickness T3 of the second light-transmitting substrate 40 was from 0.145 mm to 0.300 mm.

Three types of polarizing plates P1, P2, and P3 were used for the first polarizing plate 20. The maximum heights H of the unevenness of the first main surface 20a of the polarizing plates P1, P2, and P3 were, respectively, 0.0005 mm, 0.0005 mm, and 0.0010 mm. The maximum height H of the unevenness of the first main surface 20a was measured using a non-contact shape measuring device that uses laser autofocus (measurement length: 30 mm).

Figure 14:
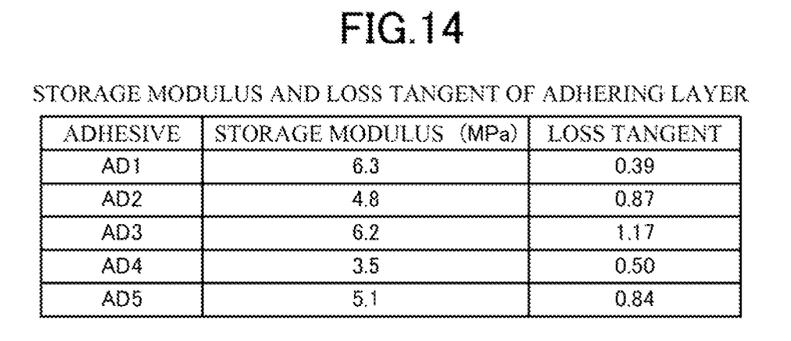
FIG. 14 is a table illustrating a storage modulus and a loss tangent of the adhering layer according to the examples.

The thickness T1 of the adhering layer 30 was set to 0.050 mm, 0.100 mm, or 0.150 mm. Five types of adhesives AD1 to AD5 were used to form the adhering layer 30. The storage modulus A and the loss tangent B of the adhering layer 30 at 20° C. and 2.5 Hz were measured by the nanoindentation method using a TI Premier Multi Scale (diamond Berkovich indenter, manufactured by HYSITRON). FIG. 14 illustrates the storage modulus A and the loss tangent B of the adhering layer 30 measured by the nanoindentation method.

Evaluation Method

A backlight BL was provided on the second polarizing plate 25 side of the liquid crystal display devices 100 of the examples, and display non-uniformity was evaluated. Specifically, display non-uniformity was visually observed, during black display, from a direction 60° with respect to a direction perpendicular to the display surface of the first liquid crystal display panel 10 (that is, the first main surface 20a of the first polarizing plate 20). Display non-uniformity of the liquid crystal display devices of the comparative examples were observed in the same manner as that of the liquid crystal display devices 100 of the examples. In the following, cases in which clear display non-uniformity is observed, are marked with an "x", cases in which slight display non-uniformity is observed are marked with an "○", and cases in which display non-uniformity is not observed are marked with a "⊙."

Figure 15:
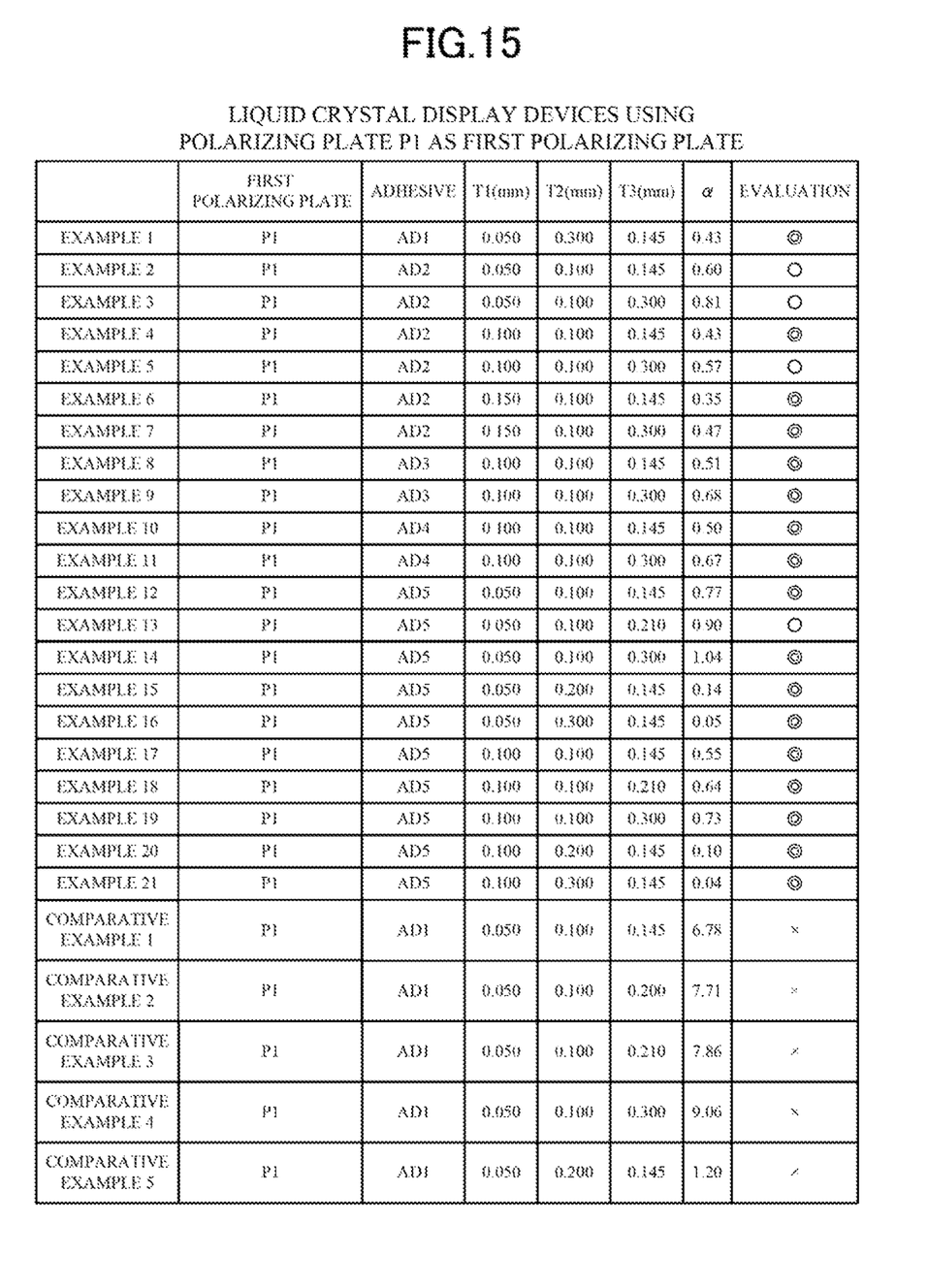
FIG. 15 is a table illustrating evaluation results of liquid crystal display devices according the examples and liquid crystal display devices according to comparison examples.
Figure 16:
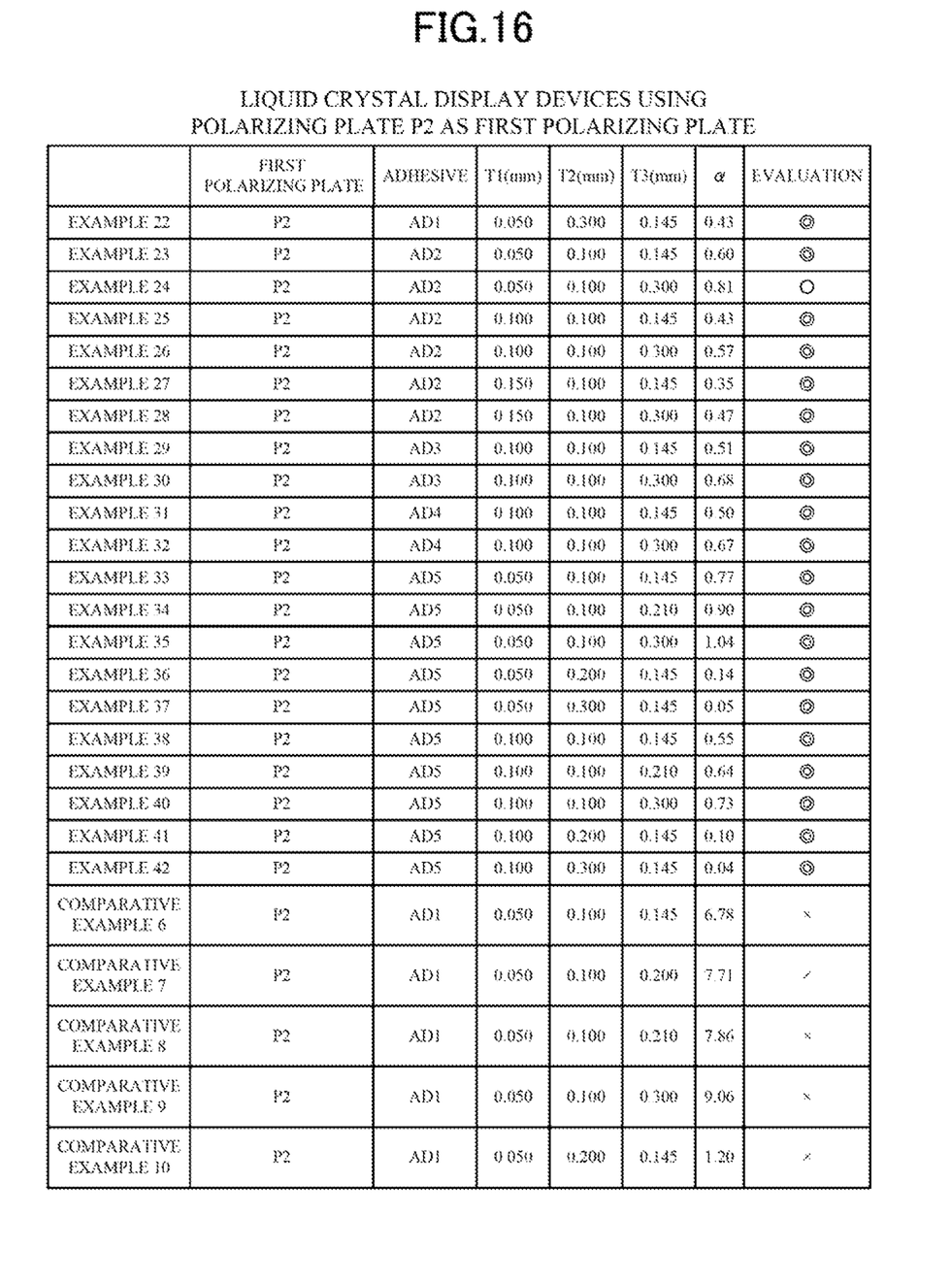
FIG. 16 is a table illustrating evaluation results of liquid crystal display devices according the examples and liquid crystal display devices according to comparison examples.

Next, the evaluation results of the liquid crystal display devices 100 of the examples and the liquid crystal display devices of the comparative examples are described. As illustrated in FIGS. 15 and 16, In cases in which the polarizing plates P1 and P2, for which the maximum height H of the unevenness of the first main surface 20a is 0.0005 mm, are used as the first polarizing plate 20, display non-uniformity can be suppressed under the conditions of T1≤0.15 mm, T2≤0.3 mm, T3≤0.3 mm, and α≤1.04. Since display non-uniformity is caused by the unevenness of the first main surface 20a, when the maximum height H of the unevenness of the first main surface 20a is 0.0005 mm or less, display non-uniformity can be suppressed under the conditions of T1≤0.15 mm, T2≤0.3 mm, T3≤0.3 mm, and α≤1.04.

Figure 17:
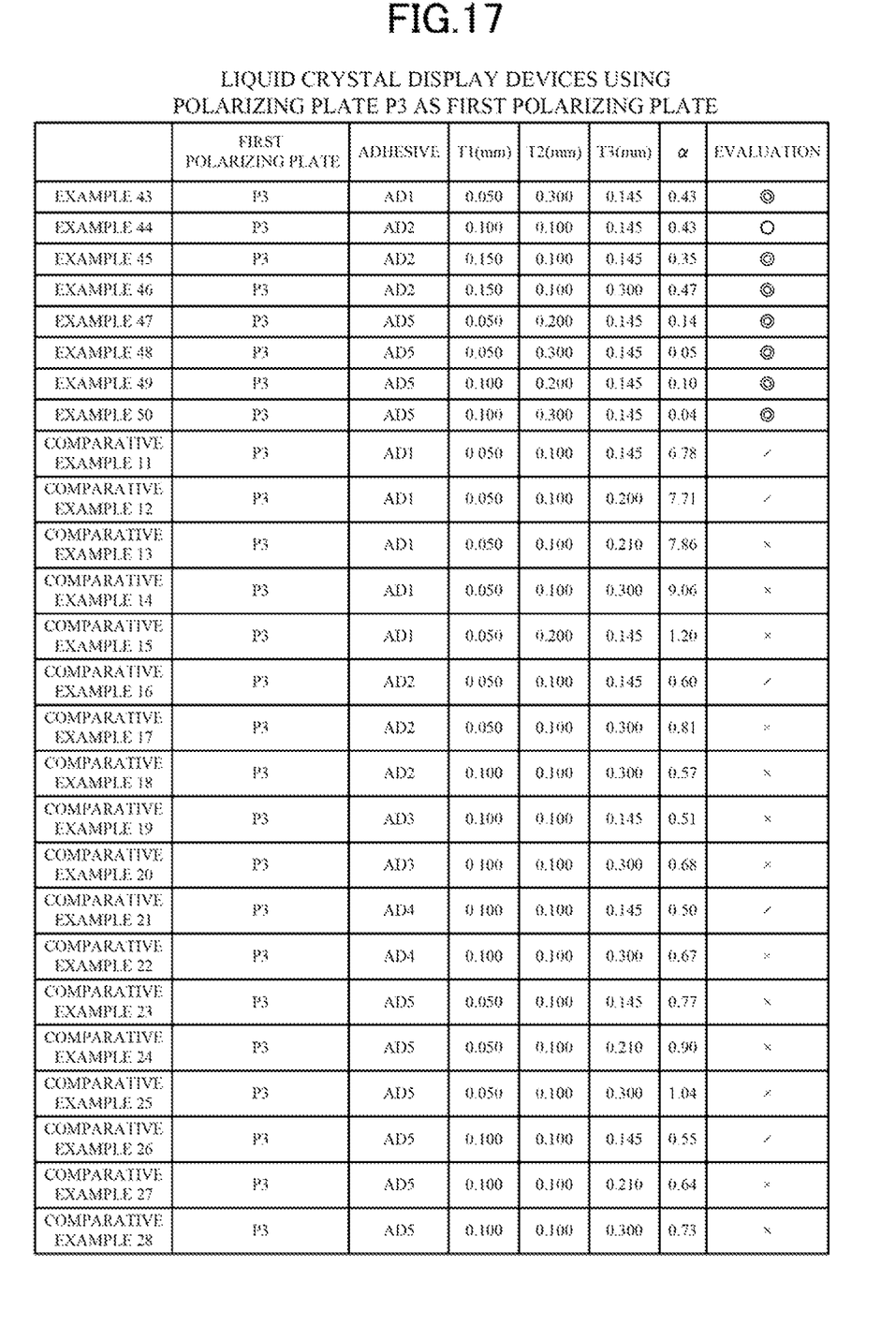
FIG. 17 is a table illustrating evaluation results of liquid crystal display devices according the examples and liquid crystal display devices according to comparison examples.

As illustrated in FIG. 17, in cases in which the polarizing plate P3, for which the maximum height H of the unevenness of the first main surface 20a is 0.0010 mm, is used as the first polarizing plate 20, display non-uniformity can be suppressed under the conditions of T1≤0.15 mm, T2≤0.3 mm, T3≤0.3 mm, and α≤0.43. Since display non-uniformity is caused by the unevenness of the first main surface 20a, when the maximum height H of the unevenness of the first main surface 20a is 0.0010 mm or less, display non-uniformity can be suppressed under the conditions of T1≤0.15 mm, T2≤0.3 mm, T3≤0.3 mm, and α≤0.43.

As described above, in cases in which the maximum height H of the unevenness of the first main surface 20a of the first polarizing plate 20 is 0.0005 mm or less, display non-uniformity of the liquid crystal display device 100 can be suppressed under the conditions of T1≤0.15 mm, T2≤0.3 mm, T3≤0.3 mm, and α≤1.04. Additionally, in cases in which the maximum height H of the unevenness of the first main surface 20a of the first polarizing plate 20 is greater than 0.0005 mm and 0.001 mm or less, display non-uniformity of the liquid crystal display device 100 can be suppressed under the conditions of T1≤0.15 mm, T2≤0.3 mm, T3≤0.3 mm, and α≤0.43.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A liquid crystal display device comprising:
a first liquid crystal display panel including a first light-transmitting substrate, a substrate, a first liquid crystal sandwiched between the first light-transmitting substrate and the substrate, and a first polarizing plate that includes a first main surface and a second main surface on a side opposite the first main surface, the second main surface being adhered to the first light-transmitting substrate;
an adhering layer provided on the first main surface of the first polarizing plate; and
a second light-transmitting substrate that is adhered to the first main surface of the first polarizing plate by the adhering layer, wherein
a thickness of the adhering layer is 0.15 mm or less, and a thickness of the first light-transmitting substrate and a thickness of the second light-transmitting substrate are 0.3 mm or less, and
when the thickness of the adhering layer is T1 (m) and a storage modulus and a loss tangent of the adhering layer at 20° C. and 2.5 Hz are respectively A (Pa) and B (dimensionless quantity), the thickness of the first light-transmitting substrate is T2 (m), the thickness of the second light-transmitting substrate is T3 (m), and an adhesion parameter expressed by formula (1) below is α, $$\alpha = 10^{-31} \times \frac{A^3 \times (T3)^{0.4}}{B^2 \times (T1)^{0.5} \times (T2)^{2.5}} \tag{1}$$

the adhesion parameter is 1.04 or less when a maximum height of an unevenness of the first main surface of the first polarizing plate is 0.0005 mm or less, and the adhesion parameter is 0.43 or less when the maximum height of the unevenness of the first main surface of the first polarizing plate is greater than 0.0005 mm and 0.001 mm or less.

2. The liquid crystal display device according to claim 1, wherein the first polarizing plate includes a polarizing layer and a phase difference layer positioned between the polarizing layer and the first light-transmitting substrate.

3. The liquid crystal display device according to claim 1, wherein the second light-transmitting substrate includes a lenticular lens or a micro lens.

4. The liquid crystal display device according to claim 1, further comprising:
   a liquid crystal lens element that includes the second light-transmitting substrate, a third light-transmitting substrate, and a second liquid crystal sandwiched between the second light-transmitting substrate and the third light-transmitting substrate.

5. The liquid crystal display device according to claim 1, wherein
   the first liquid crystal display panel includes a second polarizing plate on the substrate, and
   the liquid crystal display device further comprises a second liquid crystal display panel that includes the second light-transmitting substrate, a fourth light-transmitting substrate, a third liquid crystal sandwiched between the second light-transmitting substrate and the fourth light-transmitting substrate, and a third polarizing plate provided on the fourth light-transmitting substrate.

6. An electronic apparatus comprising:
   the liquid crystal display device according to claim 1.

* * * * *